US011451884B2

(12) United States Patent
Kuznetsov et al.

(10) Patent No.: US 11,451,884 B2
(45) Date of Patent: *Sep. 20, 2022

(54) METHODS AND APPARATUS TO EXTEND A TIMESTAMP RANGE SUPPORTED BY A WATERMARK

(71) Applicant: The Nielsen Company (US), LLC, New York, NY (US)

(72) Inventors: Vladimir Kuznetsov, Ellicott City, MD (US); Alexander Topchy, New Port Richey, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/332,643

(22) Filed: May 27, 2021

(65) Prior Publication Data

US 2021/0289270 A1 Sep. 16, 2021

Related U.S. Application Data

(60) Continuation of application No. 16/596,270, filed on Oct. 8, 2019, now Pat. No. 11,025,996, which is a (Continued)

(51) Int. Cl.
*H04H 60/32* (2008.01)
*H04N 21/8358* (2011.01)
(Continued)

(52) U.S. Cl.
CPC ... *H04N 21/8358* (2013.01); *H04N 21/23892* (2013.01); *H04N 21/2407* (2013.01); *H04N 21/8352* (2013.01)

(58) Field of Classification Search
CPC ......... H04N 21/8358; H04N 21/23892; H04N 21/2407; H04N 21/8352
See application file for complete search history.

(56) References Cited

U.S. PATENT DOCUMENTS

| 7,206,649 B2 | 4/2007 | Kirovski et al. |
| 7,328,348 B2 | 2/2008 | Couillard |

(Continued)

FOREIGN PATENT DOCUMENTS

| CN | 103891282 | 6/2014 |
| EP | 2871848 | 5/2015 |

(Continued)

OTHER PUBLICATIONS

The Org Manual, "Creating Timestamps," Jan. 9, 2018, 2 pages. Retrieved from <https://orgmode.org/manual/Creating-timestamps.html>.

(Continued)

*Primary Examiner* — Mulugeta Mengesha
(74) *Attorney, Agent, or Firm* — Hanley, Flight & Zimmerman, LLC

(57) ABSTRACT

Methods, apparatus, systems and articles of manufacture to extend a time range supported by a watermark are disclosed. Example watermark encoding apparatus disclosed herein determine which one of a plurality of timestamp cycles is to be represented by a timestamp of a watermark. Disclosed example apparatus also swap at least two symbols of the watermark when the timestamp is to represent a second one of the timestamp cycles, but do not swap the at least two symbols of the watermark when the timestamp is to represent a first one of the timestamp cycles. Disclosed example apparatus further embed the watermark in a first piece of media.

20 Claims, 8 Drawing Sheets

Related U.S. Application Data division of application No. 16/025,800, filed on Jul. 2, 2018, now Pat. No. 10,448,122.

(51) Int. Cl.
*H04N 21/24* (2011.01)
*H04N 21/2389* (2011.01)
*H04N 21/8352* (2011.01)

(56) References Cited

U.S. PATENT DOCUMENTS

| | | | |
|---|---|---|---|
| 7,389,421 | B2 | 6/2008 | Kirovski et al. |
| 7,783,610 | B2 | 8/2010 | Lin et al. |
| 8,006,258 | B2 | 8/2011 | Ramaswamy |
| 8,379,735 | B2 | 2/2013 | Lee et al. |
| 8,416,983 | B1 | 4/2013 | Joseph |
| 8,548,164 | B2 | 10/2013 | Nourry et al. |
| 9,111,358 | B2 | 8/2015 | Kuraki et al. |
| 9,319,752 | B2 | 4/2016 | Mantin et al. |
| 9,368,123 | B2 | 6/2016 | Srinivasan et al. |
| 9,418,395 | B1* | 8/2016 | Gish ............... H04N 19/42 |
| 9,653,094 | B2 | 5/2017 | Stone et al. |
| 9,811,560 | B2 | 11/2017 | Di Blas et al. |
| 10,448,122 | B1 | 10/2019 | Kuznetsov et al. |
| 10,448,123 | B1 | 10/2019 | Topchy et al. |
| 11,025,995 | B2 | 6/2021 | Topchy et al. |
| 11,025,996 | B2 | 6/2021 | Kuznetsov et al. |
| 2009/0217052 | A1* | 8/2009 | Baudry ............... G06T 1/0085 713/178 |
| 2009/0220070 | A1 | 9/2009 | Picard et al. |
| 2010/0280641 | A1* | 11/2010 | Harkness ............... G10L 19/018 700/94 |
| 2012/0113270 | A1 | 5/2012 | Spracklen |
| 2012/0163653 | A1* | 6/2012 | Anan ............... G06T 1/0021 382/100 |
| 2013/0148842 | A1 | 6/2013 | Kuraki et al. |
| 2013/0152210 | A1* | 6/2013 | Petrovic ............ H04N 1/32149 726/26 |
| 2014/0270337 | A1 | 9/2014 | Zhao et al. |
| 2016/0057317 | A1 | 2/2016 | Zhao et al. |
| 2016/0285711 | A1 | 9/2016 | Akidau et al. |
| 2017/0064351 | A1 | 3/2017 | Jakkula et al. |
| 2017/0148126 | A1 | 5/2017 | Srinivasan |
| 2017/0228848 | A1 | 8/2017 | Gish et al. |
| 2017/0316189 | A1* | 11/2017 | Winograd ............... G06T 1/005 |
| 2017/0372445 | A1 | 12/2017 | Nielsen |
| 2018/0027306 | A1 | 1/2018 | An et al. |
| 2018/0076961 | A1 | 3/2018 | Leddy et al. |
| 2018/0084313 | A1 | 3/2018 | Splaine et al. |
| 2020/0145734 | A1 | 5/2020 | Topchy et al. |
| 2020/0145735 | A1 | 5/2020 | Kuznetsov et al. |
| 2021/0289269 | A1 | 9/2021 | Topchy et al. |

FOREIGN PATENT DOCUMENTS

| | | |
|---|---|---|
| GB | 2369948 A | 12/2002 |
| KR | 10-2015-0013852 A | 2/2015 |

OTHER PUBLICATIONS

United States Patent and Trademark Office, "Notice of Allowance," mailed in connection with U.S. Appl. No. 16/025,805, filed Jun. 4, 2019, 17 pages.

United States Patent and Trademark Office, "Notice of Allowance," mailed in connection with U.S. Appl. No. 16/025,800, filed Jun. 3, 2019, 16 pages.

International Searching Authority, "International Search Report," mailed in connection with International Patent Application No. PCT/US2019/040172, filed Oct. 25, 2019, 3 pages.

International Searching Authority, "Written Opinion," mailed in connection with International Patent Application No. PCT/US2019/040172, filed Oct. 25, 2019, 7 pages.

International Searching Authority, "Written Opinion," mailed in connection with International Patent Application No. PCT/US2019/040171, filed Oct. 25, 2019, 7 pages.

International Searching Authority, "International Search Report," mailed in connection with International Patent Application No. PCT/US2019/040171, filed Oct. 25, 2019, 3 pages.

United States Patent and Trademark Office, "Non-final Office Action," mailed in connection with U.S. Appl. No. 16/596,255, filed Apr. 15, 2020, 12 pages.

United States Patent and Trademark Office, "Non-final Office Action," mailed in connection with U.S. Appl. No. 16/596,270, filed Apr. 15, 2020, 13 pages.

United States Patent and Trademark Office, "Final Office Action," mailed in connection with U.S. Appl. No. 16/596,255, filed Oct. 20, 2020, 8 pages.

United States Patent and Trademark Office, "Final Office Action," mailed in connection with U.S. Appl. No. 16/596,270, filed Oct. 20, 2020, 8 pages.

United States Patent and Trademark Office, "Notice of Allowance," mailed in connection with U.S. Appl. No. 16/596,270, filed Feb. 3, 2021, 5 pages.

United States Patent and Trademark Office, "Notice of Allowance," mailed in connection with U.S. Appl. No. 16/596,255, filed Jan. 29, 2021, 5 pages.

United States Patent and Trademark Office, "Non-final Office Action," mailed in connection with related U.S. Appl. No. 17/332,636, filed Jan. 6, 2022, 8 pages.

European Patent Office, "Extended Search Report," mailed in connection with European Patent Application No. 19830953.6-1209, dated Feb. 16, 2022, 9 pages.

European Patent Office, "Extended Search Report," mailed in connection with European Patent Application No. 198304867.7-1208, dated Mar. 3, 2022, 9 pages.

United States Patent and Trademark Office, "Notice of Allowance," mailed in connection with related U.S. Appl. No. 17/332,636, dated May 12, 2022, 8 pages.

State Intellectual Property Office, "Office Action," mailed in connection with related Chinese Patent Application No. 201980057457.7, dated Jul. 25, 2022, 11 pages (with English translation).

* cited by examiner

METHODS AND APPARATUS TO EXTEND A TIMESTAMP RANGE SUPPORTED BY A WATERMARK

RELATED APPLICATION(S)

This patent arises from a continuation of U.S. patent application Ser. No. 16/596,270 (now U.S. Pat. No. 11,025, 996), which is entitled "METHODS AND APPARATUS TO EXTEND A TIMESTAMP RANGE SUPPORTED BY A WATERMARK," and which was filed on Oct. 8, 2019, which is a divisional of U.S. patent application Ser. No. 16/025,800 (now U.S. Pat. No. 10,448,122), which is entitled "METHODS AND APPARATUS TO EXTEND A TIMESTAMP RANGE SUPPORTED BY A WATERMARK," and which was filed on Jul. 2, 2018. Priority to U.S. patent application Ser. No. 16/596,270 and U.S. patent application Ser. No. 16/025,800 is claimed. U.S. patent application Ser. No. 16/596,270 and U.S. patent application Ser. No. 16/025,800 are hereby incorporated herein by reference in their respective entireties.

FIELD OF THE DISCLOSURE

This disclosure relates generally to media watermarking and, more particularly, to methods and apparatus to extend a timestamp range supported by a watermark.

BACKGROUND

Watermarks can be embedded or otherwise included in media to enable additional information to be conveyed with the media. For example, audio watermarks can be embedded or otherwise included in the audio data/signal portion of a media stream, file and/or signal to convey data, such as media identification information, copyright protection information, etc., with the media. Such watermarks enable monitoring of the distribution and/or use of media, such as by detecting watermarks present in television broadcasts, radio broadcasts, streamed multimedia, etc., to identify the particular media being presented to viewers, listeners, users, etc. Such information can be valuable to advertisers, content providers, and the like.

Some watermarks also include timestamps to represent time information associated with the media in which the watermark is embedded. For example, the timestamps can represent a broadcast time indicating when the media was broadcast, an access time indicated when the media was accessed (e.g., downloaded, streamed, etc.), a creation time of the media indicating when the media was created, etc. Such timestamps can be used to associate monitored media with a particular media broadcast, a particular media access, a particular media version, etc.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
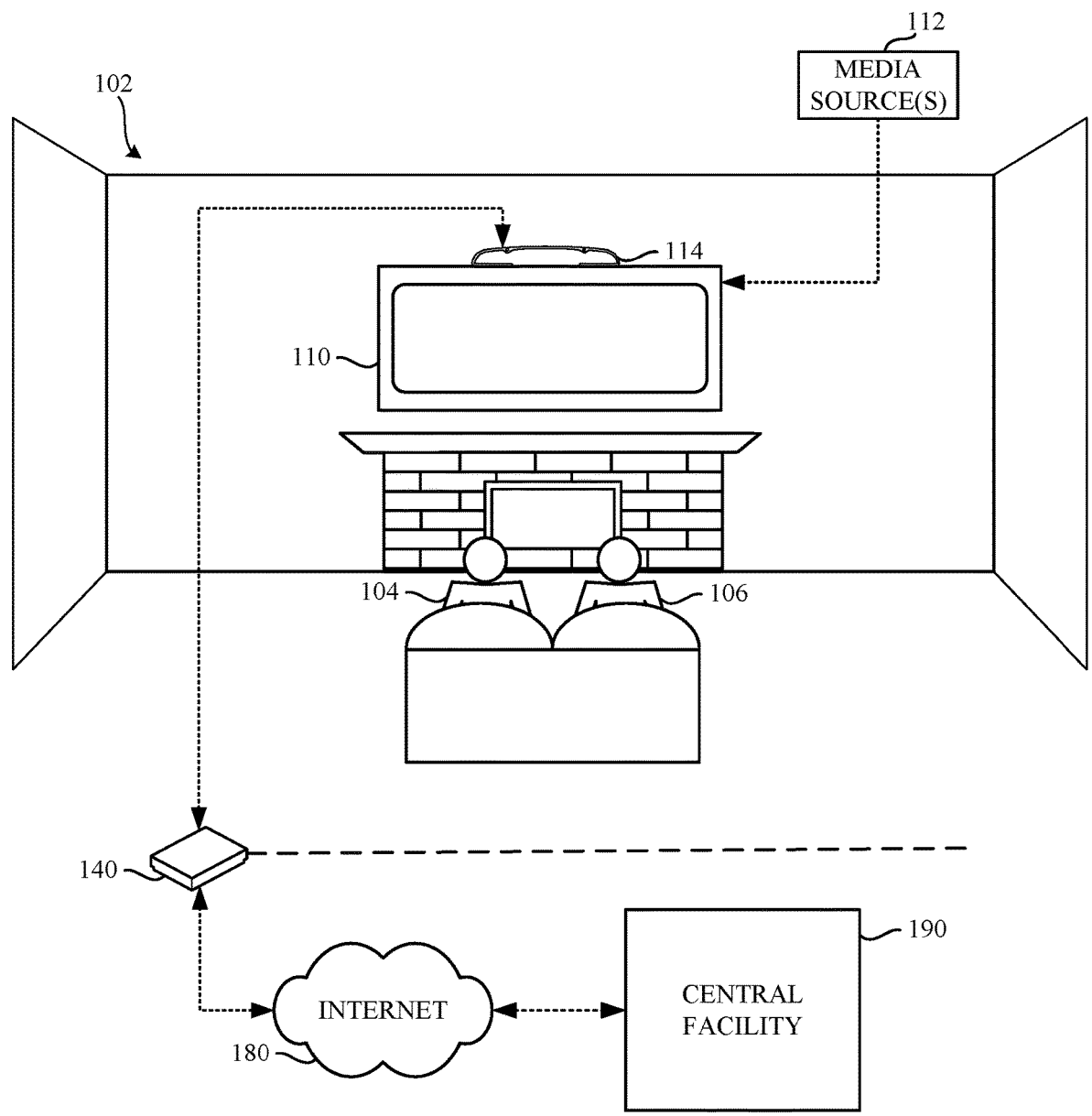
FIG. 1 is a block diagram of an example environment of use including an example media monitoring system structured to extend a time range supported by a watermark in accordance with teachings of this disclosure.

Methods, apparatus, systems and articles of manufacture (e.g., physical storage media) to extend a time range supported by a watermark are disclosed herein. Example watermark encoding apparatus disclosed herein include a timestamp cycle evaluator to determine which one of a plurality of timestamp cycles is to be represented by a timestamp of a watermark. Disclosed example watermark encoding apparatus also include a symbol swapper to swap at least two symbols of the watermark when the timestamp is to represent a second one of the timestamp cycles but not to swap the at least two symbols of the watermark when the timestamp is to represent a first one of the timestamp cycles. Disclosed example watermark encoding apparatus further include a watermark embedder to embed the watermark in a first piece of media.

In some disclosed examples, the timestamp has a timestamp range covering one timestamp cycle, and the watermark has a timestamp range covering the plurality of timestamp cycles. For example, one timestamp cycle can correspond to a time period of substantially 28 days. In some disclosed examples, a number of timestamp cycles in the plurality of timestamp cycles is two.

Additionally or alternatively, in some disclosed examples, the watermark includes a first set of symbols representing data and a second set of symbols representing the timestamp, and the at least two symbols to be swapped are included in the first set of symbols representing the data. For example, the data can correspond to an identifier of the piece of media. Additionally or alternatively, in some such disclosed examples, the first set of symbols includes a first subset of symbols and a second subset of symbols, with respective ones of the second subset of symbols being determined from corresponding ones of the first subset of symbols based on another symbol not included in the first and second subsets of symbols. In some such disclosed examples, the at least two symbols to be swapped are included in one of the first subset of symbols or the second subset of symbols, but not both of the first and second subsets of symbols.

Example watermark decoding apparatus disclosed herein include a watermark validator to determine whether a first sequence of symbols of a watermark decoded from a first piece of media is valid. Disclosed example watermark decoding apparatus also include a symbol swapper to swap at least two symbols of the watermark to determine a second sequence of symbols when the first sequence of symbols is not valid. Disclosed example watermark decoding apparatus further include a timestamp cycle decoder to associate the watermark with a first one of a plurality of timestamp cycles when the first sequence of symbols is valid, and when the first sequence of symbols is not valid, associate the watermark with a second one of a plurality of timestamp cycles when the second sequence of symbols is determined to be valid by the watermark validator.

In some disclosed examples, the first sequence of symbols includes a first set of symbols representing data and a second set of symbols representing a timestamp. In some such disclosed examples, the at least two symbols to be swapped to determine the second sequence of symbols are included in the first set of symbols representing the data. In some such disclosed examples, the first set of symbols includes a first subset of symbols and a second subset of symbols, and the watermark validator is to determine the first sequence of symbols is valid when respective ones of the second subset of symbols are related to corresponding ones of the first subset of symbols based on another symbol not included in the first and second subsets of symbols. In some such disclosed examples, the watermark validator is to determine the first sequence of symbols is not valid when respective ones of the second subset of symbols are not related to corresponding ones of the first subset of symbols based on another symbol not included in the first and second subsets of symbols.

Additionally or alternatively, in some disclosed examples, the timestamp has a timestamp range covering one timestamp cycle, and the watermark has a timestamp range covering the plurality of timestamp cycles. In some such disclosed examples, one timestamp cycle corresponds to a time period of substantially 28 days. In some disclosed examples, the data corresponds to an identifier of the piece of media. In some disclosed examples, a number of timestamp cycles in the plurality of timestamp cycles is two.

These and other example methods, apparatus, systems and articles of manufacture (e.g., physical storage media) to extend a timestamp ranges supported by a watermark are disclosed in further detail below.

Media watermarking is a technique used to identify media, such as television broadcasts, radio broadcasts, advertisements (television and/or radio), downloaded media, streaming media, prepackaged media, etc. Existing media watermarking techniques identify media by embedding one or more codes (e.g., one or more watermarks), such as media identifying information and/or an identifier that may be mapped to media identifying information, into an audio and/or video component of the media. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are detected/decoded and used to obtain data that can be mapped to media identifying information.

Unlike media monitoring techniques based on codes and/or watermarks embedded or otherwise included in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. Generally, a good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

As noted above, watermarks embedded in media may include timestamps to represent time information associated with the media in which the watermark is embedded. For example, the timestamps can represent a broadcast time indicating when the media was broadcast, an access time indicated when the media was accessed (e.g., downloaded, streamed, etc.), a creation time of the media indicating when the media was created, etc. Such timestamps can be used to associate monitored media with a particular media broadcast, a particular media access, a particular media version, etc.

The time period supported by a watermark timestamp is generally related to the number of symbols of the watermark payload used to represent the timestamp. (A symbol may include one or more bits.) As such, a timestamp supporting a long time period may require a relatively large number of symbols, whereas a timestamp supporting a short time period may require a fewer number of symbols. Thus, for a given payload size, there is a tradeoff between the number of data symbols conveying media identification (and/or other) information, and the number of timestamp symbols, which affects the corresponding time period that can be represented by the timestamp. For example, the Critical Band Encoding Technology (CBET) watermarks of The Nielsen Company (US), LLC., support a time period of substantially (e.g., on the order of) 28 days.

Although the time period supported by a watermark's timestamp may be sufficient for some purposes, such as monitoring presentations of live media broadcasts, such a time period may not be sufficient for other purposes. For example, the prevalence of digital video recorders, video-on-demand services, and other technologies have increased that likelihood that a monitored media presentation may have been time-shifted (e.g., presented at a different time than when the media was broadcast, accessed, etc.). Furthermore, the storage capacities of such technologies continue to increase, resulting in a corresponding increase in the duration of time by which media can be time-shifted. However, if media is time-shifted by a time duration exceeding the time period supported by the timestamp of a watermark embedded in the media, the time represented by the timestamp becomes ambiguous because the number of cycles of the timestamp period occurring from the time represented by the timestamp and the time when the media was presented (and when the watermark was decoded from the media) is unknown. This is because the value of timestamp rolls-over at the end of the timestamp period and, thus, different times separated by multiples of the timestamp period will all have the same timestamp value (similar to how different times separated by a 12-hour period all have the same values on a typical digital alarm clock).

One solution to enable a watermark to support a longer duration of time shifting is to increase the number of watermark symbols used to represent the watermark timestamp. However, such a solution can require a corresponding reduction in the number of data symbols able to be conveyed by the watermark if the watermark payload size remains unchanged, or can require a redesign of the watermark structure (and associated watermark encoder and decoder technology) to increase the size of the watermark payload to increase the number of timestamp symbols without decreasing the number of data symbols. In contrast, example watermarking techniques disclosed herein provide technical solutions to the problem of extending a timestamp range supported by a watermark, but without the need to increase the number of timestamp symbols and, thus, without decreasing the number of watermark data symbols or requiring a redesign of the watermark structure. Disclosed example watermarking techniques achieve this technical solution by swapping data symbols of the watermark according to different symbol swapping configurations to represent different timestamp cycles, with each timestamp cycle covering a corresponding period of the timestamp. For example, a swapping configuration corresponding to no symbol swapping may be used to represent a first timestamp cycle covering a first period of the timestamp (e.g., a first 28 day period), whereas a swapping configuration corresponding swapping of at least two data symbols of the watermark may be used to represent a second timestamp cycle covering a subsequent second period of the timestamp (e.g., a subsequent second 28 day period). Such a technical solution extends the range supported by watermark timestamp to be a multiple number of timestamp periods corresponding to the number of different possible swapping configurations. For example, if there are two possible swapping configurations (e.g., no swapping vs. swapping of at least two specified symbols), then the range of the timestamp is extended to support two timestamp periods. As disclosed in further detail below, a watermark decoder implemented in accordance with teachings of this disclosure can determine which symbol swapping configuration what was applied to a detected watermark to thereby determine which timestamp cycle is associated with the timestamp of the detected watermark.

Figure 5:
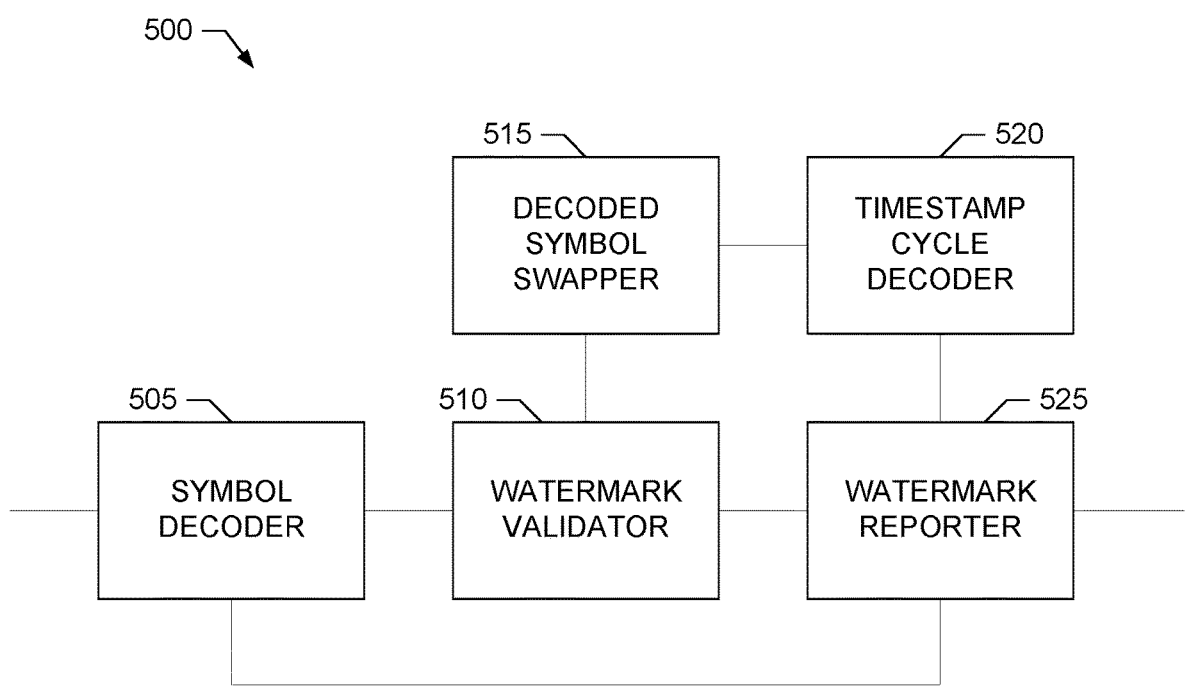
FIG. 5 is a block diagram of an example watermark decoder for use in the example media monitoring system of FIG. 1 and structured to extend a time range supported by a watermark in accordance with teachings of this disclosure.

Turning to the figures, a block diagram of an example environment of use including an example media monitoring system structured to extend a time range supported by a watermark in accordance with teachings of this disclosure is illustrated in FIG. 1. In the illustrated example of FIG. 1, an example media presentation environment 102 includes example panelists 104, 106, an example media presentation device 110 that receives media from an example media source 112, and an example meter 114. The example meter 114 identifies the media presented by the example media presentation device 110 and reports media monitoring information to an example central facility 190 of an example audience measurement entity via an example gateway 140 and an example network 180. In some examples, the meter 114 is referred to as an audience measurement device. In the illustrated example, the meter includes an example watermark decoder structured to extend a time range supported by a watermark in accordance with teachings of this disclosure. An example of such a watermark decoder is illustrated in FIG. 5, which is described in further detail below.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media presentation device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media presentation device 110 is a television. However, the example media presentation device 110 can correspond to any type of audio, video and/or multimedia presentation device capable of presenting media audibly and/or visually. In some examples, the media presentation device 110 (e.g., a television) may communicate audio to another media presentation device (e.g., an audio/video receiver) for output by one or more speakers (e.g., surround sound speakers, a sound bar, etc.). As another example, the media presentation device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media presentation device 110 receives media from the media source 112. The media source 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media presentation device 110 can correspond to a television and/or display device that supports the National Television Standards Committee (NTSC) standard, the Phase Alternating Line (PAL) standard, the Système Électronique pour Couleur avec Mèmoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media.

In examples disclosed herein, an audience measurement entity provides the meter 114 to the panelist 104, 106 (or household of panelists) such that the meter 114 may be installed by the panelist 104, 106 by simply powering the meter 114 and placing the meter 114 in the media presentation environment 102 and/or near the media presentation device 110 (e.g., near a television set). In some examples, more complex installation activities may be performed such as, for example, affixing the meter 114 to the media presentation device 110, electronically connecting the meter 114 to the media presentation device 110, etc. The example meter 114 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner, such as, for example, by physically mailing the meter 114, by physically mailing a memory of the meter 114, etc.

The meter 114 of the illustrated example combines audience measurement data and people metering data. For example, audience measurement data is determined by monitoring media output by the media presentation device 110 and/or other media presentation device(s), and audience identification data (also referred to as demographic data, people monitoring data, etc.) is determined from people monitoring data provided to the meter 114. Thus, the example meter 114 provides dual functionality of an audience measurement meter that is to collect audience measurement data, and a people meter that is to collect and/or associate demographic information corresponding to the collected audience measurement data.

For example, the meter 114 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media presentation device 110. To extract media identification data, the meter 114 of the illustrated example of FIG. 1 monitors for watermarks (sometimes referred to as codes) included in the presented media. In examples disclosed herein, a watermark includes a sequence of symbols, with some symbols carrying portions of media-identifying information which, when concatenated into a first symbol sequence, form the media identification, and other symbols carrying portions of a timestamp which, when concatenated into a second symbol sequence, form the timestamp. As disclosed in further detail below, a disclosed example watermark decoder included in the meter 114 is also able to detect a swapping configuration applied to the watermark symbols and further associate a particular timestamp cycle with the watermark timestamp based on the swapping configuration applied to the watermark symbols.

Depending on the type(s) of metering the meter 114 is to perform, the meter 114 can be physically coupled to the media presentation device 110 or may be configured to capture audio emitted externally by the media presenting device 110 (e.g., free field audio) such that direct physical coupling to the media presenting device 110 is not required. For example, the meter 114 of the illustrated example may employ non-invasive monitoring not involving any physical connection to the media presentation device 110 (e.g., via Bluetooth® connection, WIFI® connection, acoustic sensing via one or more microphone(s) and/or other acoustic sensor(s), etc.) and/or invasive monitoring involving one or more physical connections to the media presentation device 110 (e.g., via USB connection, a High Definition Media Interface (HDMI) connection, an Ethernet cable connection, etc.).

In examples disclosed herein, to monitor media presented by the media presentation device 110, the meter 114 of the illustrated example senses audio (e.g., acoustic signals or ambient audio) output (e.g., emitted) by the media presentation device 110. For example, the meter 114 processes the signals obtained from the media presentation device 110 to detect media and/or source identifying signals (e.g., audio watermarks) embedded in portion(s) (e.g., audio portions) of the media presented by the media presentation device 110. To, for example, sense ambient audio output by the media presentation device 110, the meter 114 of the illustrated example includes an example acoustic sensor (e.g., a microphone). In some examples, the meter 114 may process audio signals obtained from the media presentation device 110 via a direct cable connection to detect media and/or source identifying audio watermarks embedded in such audio signals.

To generate exposure data for the media, identification(s) of media to which the audience is exposed are correlated with people data (e.g., presence information) collected by the meter 114. The meter 114 of the illustrated example collects inputs (e.g., audience identification data) representative of the identities of the audience member(s) (e.g., the panelists 104, 106). In some examples, the meter 114 collects audience identification data by periodically and/or a-periodically prompting audience members in the media presentation environment 102 to identify themselves as present in the audience. In some examples, the meter 114 responds to predetermined events (e.g., when the media presenting device 110 is turned on, a channel is changed, an infrared control signal is detected, etc.) by prompting the audience member(s) to self-identify. The audience identification data and the exposure data can then be compiled with the demographic data collected from audience members such as, for example, the panelists 104, 106 during registration to develop metrics reflecting, for example, the demographic composition of the audience. The demographic data includes, for example, age, gender, income level, educational level, marital status, geographic location, race, etc., of the panelist.

In some examples, the meter 114 may be configured to receive panelist information via an input device such as, for example, a remote control, an Apple® iPad®, a cell phone, etc. In such examples, the meter 114 prompts the audience members to indicate their presence by pressing an appropriate input key on the input device. The meter 114 of the illustrated example may also determine times at which to prompt the audience members to enter information to the meter 114. In some examples, the meter 114 of FIG. 1 supports audio watermarking for people monitoring, which enables the meter 114 to detect the presence of a panelist-identifying metering device in the vicinity (e.g., in the media presentation environment 102) of the media presentation device 110. For example, the acoustic sensor of the meter 114 is able to sense example audio output (e.g., emitted) by an example panelist-identifying metering device, such as, for example, a wristband, a cell phone, etc., that is uniquely associated with a particular panelist. The audio output by the example panelist-identifying metering device may include, for example, one or more audio watermarks to facilitate identification of the panelist-identifying metering device and/or the panelist 104 associated with the panelist-identifying metering device.

The meter 114 of the illustrated example communicates with a remotely located central facility 190 of the audience measurement entity. In the illustrated example of FIG. 1, the example meter 114 communicates with the central facility 190 via a gateway 140 and a network 180. The example meter 114 of FIG. 1 sends media identification data and/or audience identification data to the central facility 190 periodically, a-periodically and/or upon request by the central facility 190.

The example gateway 140 of the illustrated example of FIG. 1 can be implemented by a router that enables the meter 114 and/or other devices in the media presentation environment (e.g., the media presentation device 110) to communicate with the network 180 (e.g., the Internet.)

In some examples, the example gateway 140 facilitates delivery of media from the media source(s) 112 to the media presentation device 110 via the Internet. In some examples, the example gateway 140 includes gateway functionality such as modem capabilities. In some other examples, the example gateway 140 is implemented in two or more devices (e.g., a router, a modem, a switch, a firewall, etc.).

The gateway 140 of the illustrated example may communicate with the network 126 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the media presentation environment 102. In the illustrated example, the LAN is a wireless local area network (WLAN), and allows the meter 114, the media presentation device 110, etc., to transmit and/or receive data via the Internet. Alternatively, the gateway 140 may be coupled to such a LAN.

The network 180 of the illustrated example can be implemented by a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114. For example, the example central facility 190 of FIG. 1 combines audience identification data and program identification data from multiple households to generate aggregated media monitoring information. The central facility 190 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 114 of the illustrated example provides a combination of media metering and people metering. The meter 114 of FIG. 1 includes its own housing, processor, memory and/or software to perform the desired media monitoring and/or people monitoring functions. The example meter 114 of FIG. 1 is a stationary device disposed on or near the media presentation device 110. To identify and/or confirm the presence of a panelist present in the media presentation environment 102, the example meter 114 of the illustrated example includes a display. For example, the display provides identification of the panelists 104, 106 present in the media presentation environment 102. For example, in the illustrated example, the meter 114 displays indicia (e.g., illuminated numerical numerals 1, 2, 3, etc.) identifying and/or confirming the presence of the first panelist 104, the second panelist 106, etc. In the illustrated example, the meter 114 is affixed to a top of the media presentation device 110. However, the meter 114 may be affixed to the media presentation device in any other orientation, such as, for example, on a side of the media presentation device 110, on the bottom of the media presentation device 110, and/or may not be affixed to the media presentation device 110. For example, the meter 114 may be placed in a location near the media presentation device 110.

Figure 2:
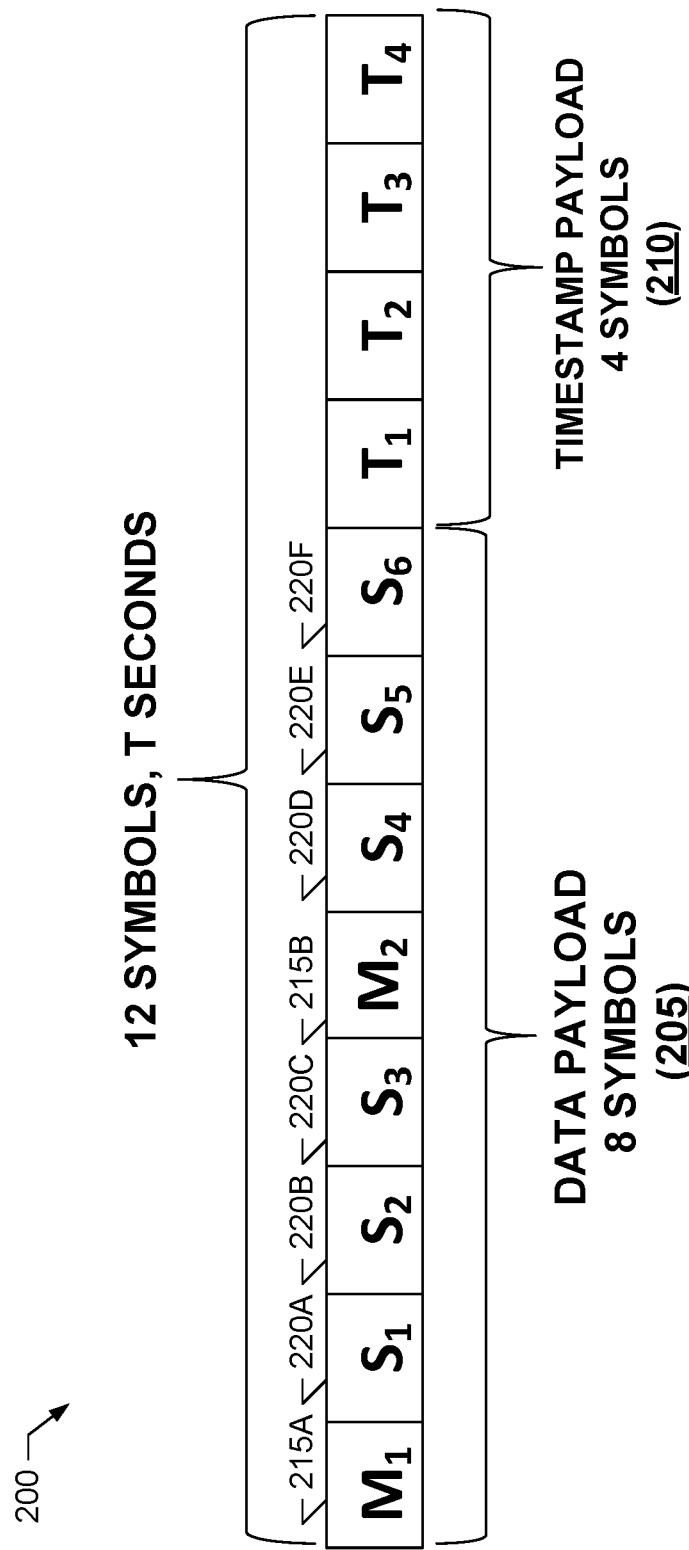
FIG. 2 is a block diagram of an example media watermark to be detected and processed by the example media monitoring system of FIG. 1.

FIG. 2 illustrates an example watermark 200 that the example meter 114 of FIG. 1 may be configured to detect. The watermark 200 of the illustrated example is embedded or otherwise included in media to be presented by media device(s), such as the example media device 110. For example, the watermark 200 may be embedded in an audio portion (e.g., an audio data portion, an audio signal portion, etc.) of the media, a video portion (e.g., a video data portion, a video signal portion, etc.) of the media, or a combination thereof. The example watermark 200 of FIG. 2 includes an example first group of symbols 205 and an example second group of symbols 210. In the illustrated example of FIG. 2, the first group of symbols 205 is repeated in successive watermarks 200 embedded/included in the media, whereas the second group of symbols 210 differs between successive watermarks 200 embedded/included in the media.

In the example watermark of FIG. 2, the first group of symbols 205 conveys media identification data (e.g., a media identifier) identifying the media watermarked by the watermark 200. For example, the media identification data conveyed by the first group of symbols 205 may include data identifying a broadcast station providing the media, a name (e.g., program name) of the media, a source (e.g., a website) of the media, etc. Thus, in the illustrated example of FIG. 2, the first group of symbols 205 is also referred to as a first group of media identification symbols 205 (or simply the media identification symbols 205 or media identification payload 205). In some examples, the first group of symbols 205 includes any type of data, which may or may not include media identification information. In such examples, the first group of symbols 205 may be referred to as the data symbols 205, or data payload 205, or data 205 of the watermark 200. In the illustrated example, the media identification data conveyed by the first group of symbols 205 (e.g., the media identification symbols 205) is repeated in successive watermarks 200 embedded/included in the media.

In some examples, the first group of symbols 205 of the watermark 200 includes example marker symbols 215A-B to assist the watermark detector 145 in detecting the start of the watermark 200 in the watermarked media, and example data symbols 220A-F to convey the media identification data. Also, in some examples, corresponding symbols pairs in similar respective locations after the first marker symbol 215A and the second marker symbol 215B are related by an offset. For example, the value of data symbol 220D may correspond to the value of data symbol 220A incremented by an offset, the value of data symbol 220E may correspond to the value of data symbol 220B incremented by the same offset, and the value of data symbol 220F may correspond to the value of data symbol 220C incremented by the same offset, as well. In such examples, the symbols pairs 220A/D, 220B/E and 220C/F are referred to as symbol offset pairs, or offset pairs, and the offset used to generate the symbol offset pairs forms an additional data symbol that can be used to convey the media identification data.

For example, the watermark payload of example watermark 200 of FIG. 2 has the following structure:

[M1 S1 S2 S3 M2 S4 S5 S6 T1 T2 T3 T4]

where the symbols [S4 S5 S6] are related to the symbols [S1 S2 S3] according to the following first system of relationships:

$S4=(S1+S0) \bmod 16$ $S5=(S2+S0) \bmod 16$, and $S6=(S3+S0) \bmod 16$, with "mod" representing the modulo operation. In this example, the symbol S0 is another symbol represented by the offset between symbols [S1 S2 S3] and symbols [S4 S5 S6]. In this example, the symbols [S0 S1 S2 S3] are data symbols representing a value of a media identifier, such as a source identifier (SID).

In the example watermark 200 of FIG. 2, the second group of symbols 210 conveys timestamp data (e.g., a timestamp) identifying, for example, a broadcast time of the watermarked media, an access time of the watermarked media, a creation time of the watermarked media, a particular elapsed time within the watermarked media, etc. Thus, in the illustrated example of FIG. 2, the second group of symbols 210 is also referred to as the second group of timestamp symbols 210 (or simply the timestamp symbols 210, or timestamp payload 210, or timestamp 210). Furthermore, the timestamp data conveyed by the second group of symbols 210 (e.g., the timestamp symbols 210) differs in successive watermarks 200 embedded/included in the media (e.g., as the elapsed time of the watermarked media increases with each successive watermark 200).

In the illustrated example of FIG. 2, the watermark 200 is embedded/included in media at a repetition interval of T seconds (or, in other words, at a repetition rate of 1/T seconds), with the first group of symbols 205 remaining the same in successive watermarks 200, and the second group of symbols 205 varying in successive watermarks 200. For example, the repetition interval T may correspond to T=4.8 seconds. As there are 12 symbols in the example watermark 200 (e.g., 8 symbols in the first group of symbols 205 and 4 symbols in the second group of symbols 210) each watermark symbol in the illustrated example has a duration of 4.8/12=0.4 seconds. However, other values for the repetition interval T may be used in other examples.

In some examples, a watermark symbol included in the watermark 200 is able to take on one of several possible symbol values. For example, if a symbol in the watermark 200 represents 4 bits of data, then the symbol is able to take on one of 16 different possible values. For example, each possible symbol value may correspond to a different signal amplitude, a different set of code frequencies, etc. In some such examples, to detect a watermark symbol embedded/included in watermarked media, the example meter 114 processes monitored media data/signals output from the example media device 110 to determine measured values (e.g., signal-to-noise ratio (SNR) values) corresponding to each possible symbol value the symbol may have. The meter 114 then selects the symbol value corresponding to the best (e.g., strongest, largest, etc.) measured value (possibly after averaging across multiple samples of the media data/signal) as the detected symbol value for that particular watermark symbol.

In the illustrated example, the meter 114 further uses the relationships between the symbols [S1 S2 S3] and the symbols [S4 S5 S6] specified above to decode the other symbol S0 and further determine whether the decoded symbols correspond to a valid symbol sequence. For example, let [A1 A2 A3 A4 A5 A6] represent the respective values of the watermark symbols [S1 S2 S3 S4 S5 S6] detected by the meter 114. The detected watermark symbols [A1 A2 A3 A4 A5 A6] are related to the original watermark symbols [S1 S2 S3 S4 S5 S6] according to the following second system of relationships:

$A1=S1+\varepsilon 1$ $A2=S2+\varepsilon 2$ $A3=S3+\varepsilon 3$ $A4=S4+\varepsilon 4$ $A5=S5+\varepsilon 5$ $A6=S6+\varepsilon 6$ where [ε1 ε2 ε3 ε4 ε5 ε6] represent respective errors in the [A1 A2 A3 A4 A5 A6] relative to the original watermark symbols [S1 S2 S3 S4 S5 S6] (e.g., introduced by transmission errors, sensing errors, etc.) and the additions are modulo additions (e.g., modulo 16 additions in this example, but in other example, the modulo addition will be based on the number of different values each symbol can have, which corresponds to the number of bits represented by the symbol). To decode the symbol S0 and further validate the decoded symbols, the meter 114 attempts to find a single offset value that relates [A1 A2 A3] to [A4 A5 A6] by modulo addition according to the first system of relationships given above. To do this, the meter 114 assumes the values of the detected watermark symbols [A1 A2 A3] are correct and correspond to the original watermark symbols [S1 S2 S3]. The meter 114 then evaluates the first system of relationships above using different offset values to attempt to find one offset value that when added to each of [A1 A2 A3] by modulo addition results in [A4 A5 A6]. If the meter 114 is able to find one such offset value, that offset value is set to be the decoded value of S0, and the resulting sequence of decoded watermark data symbols [S0 S1 S2 S3] is considered valid. If the meter 114 is unable to find such a single offset value that relates each of [A1 A2 A3] to [A4 A5 A6] by modulo addition, the meter 114 determines the decoded watermark symbols are not valid. (In some examples, if two of the three decoded symbol pairs are related by the same offset, the resulting decoded symbols are not considered as invalid but are indicated as having a lower reliability score.)

Figure 3:
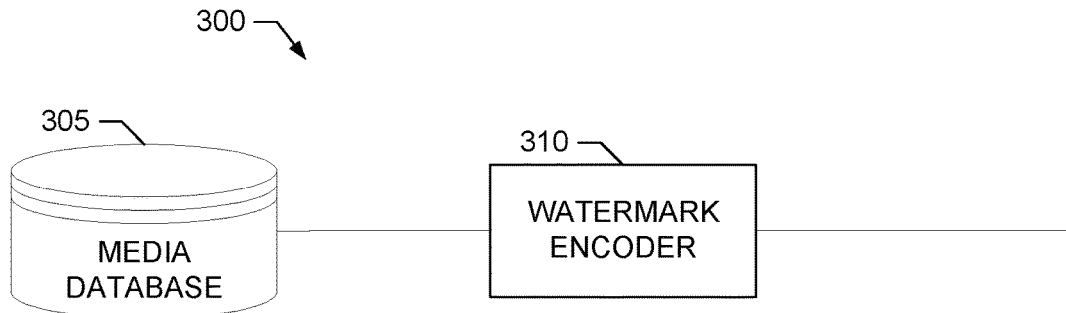
FIG. 3 is a block diagram of an example media provider including an example watermark encoder structured to extend a time range supported by a watermark in accordance with teachings of this disclosure.

A block diagram of an example media provider 300 providing watermarked media in accordance with teachings of this disclosure is illustrated in FIG. 3. For example, the media provider 300 can correspond to any type of media provider, such as a television station, a cable network, a satellite network (e.g., television or radio), a radio station, a streaming media service (e.g., such as Hulu™, Netflix®, etc.), etc. As such, the media distributed by the media provider 200 can correspond to any type of media, such as television programming, radio programming, multimedia (e.g., audio and/or visual) content, etc. In the illustrated example, the media provider 300 can distribute a particular piece of media (e.g., such as a particular television program, a particular radio program, a particular movie, etc.) to recipients (e.g., television viewers, radio listeners, computer users, electronic device users, etc.) via one or more program broadcasts, distribution channels, etc. (e.g., such a one or more radio frequency, cable and/or satellite television and/or radio channels, one or more networks carrying one or more digital transport channels, etc.). The example media provider 300 can correspond to the media source 114 of FIG. 1.

In the illustrated example of FIG. 3, the media provider 300 includes an example media database 305 to store pieces of media (e.g., media content, media advertisements/commercials, etc.) to be distributed by the media provider 300. The media provider 300 can be implemented by any type or combination of one or more memories and/or storage devices. For example, the media provider 300 can be implemented by the mass storage device 828 and/or the volatile memory 814 in the example processing system 800 of FIG. 8, which is described in further detail below.

The example media provider 300 of FIG. 3 also includes an example watermark encoder 310 to retrieve a piece of media stored in the media database 305 and encode (e.g., embed) a sequence of watermarks into the media. For example, the sequence of watermarks encoded by the watermark encoder 310 in the piece of media can be a sequence of audio watermarks, such as the watermark 200 of FIG. 2, encoded in audio portion(s) of the media at successive intervals of time (e.g., such as every 4.8 seconds or any other constant or changing interval of time) using any appropriate audio watermarking technique. Additionally or alternatively, the sequence of watermarks encoded in the piece of media by the watermark encoder 210 can be a sequence of video watermarks encoded in video portion(s) of the media content at successive intervals of time using any appropriate video watermarking technique. In some examples, the watermarks can include or otherwise convey media identifying payload data (e.g., the data payload 205) that identifies, for example, a source of the media content (e.g., such as the particular media provider 300) and/or the media itself (e.g., such as a title of the media content, an episode number, etc.). In some examples, the watermarks can include or otherwise convey timestamp payload data (e.g., the timestamp payload 210) representing a timestamp associated with the watermark. As disclosed in further detail below, the watermark encoder 210 is also structured to extend a timestamp range supported by the watermarks in accordance with teachings of this disclosure.

Figure 4:
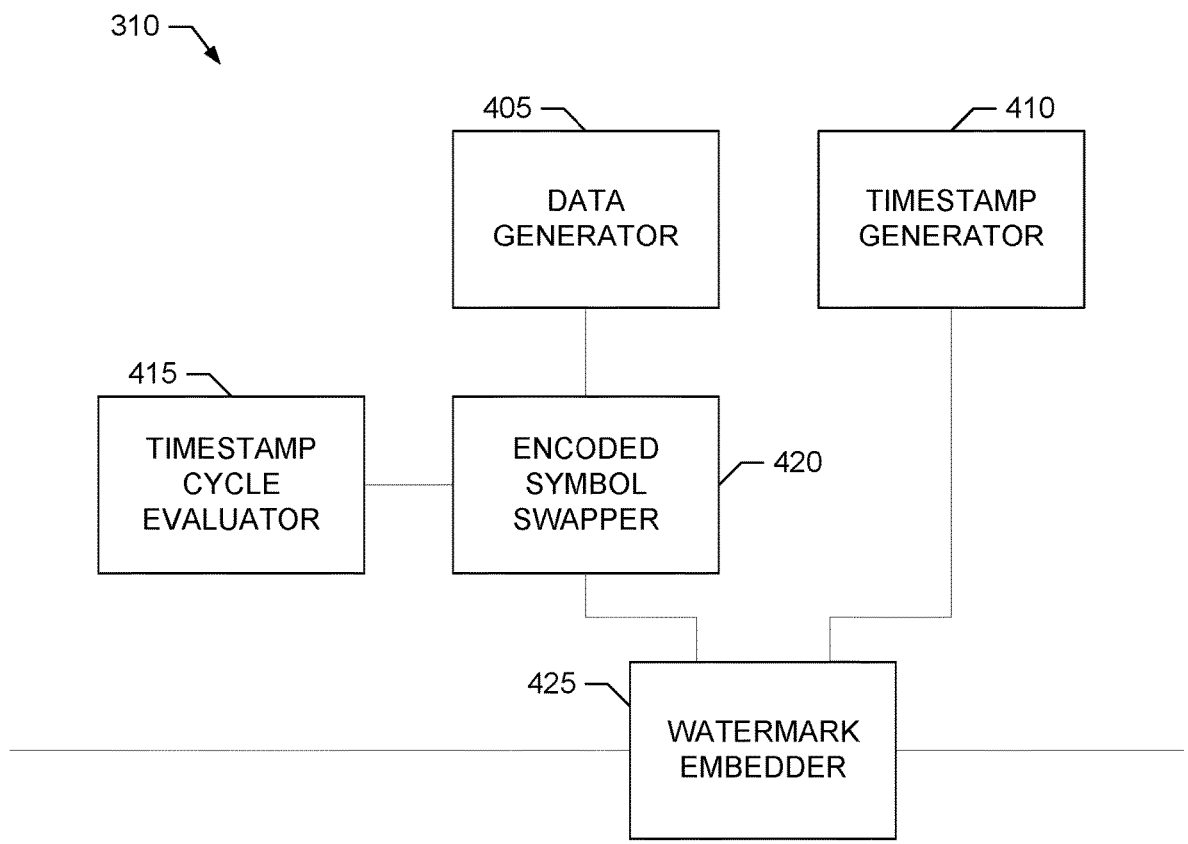
FIG. 4 is a block diagram of an example implementation of the watermark encoder of FIG. 3.

A block diagram of an example implementation of the watermark encoder 310 of FIG. 3 is illustrated in FIG. 4. The example watermark encoder 310 of FIG. 4 is structured to extend a range of a watermark timestamp, such as the timestamp 210, included in a watermark, such as the watermark 200, to be embedded in media. The example watermark encoder 310 of FIG. 4 includes an example data generator 405 to generate or otherwise obtain (e.g., download, retrieve from memory, etc.) the data symbols for the media identification payload 205 or data payload 205 of the watermark 200 described above. As such, the data generator 405 is an example of means for generating the media identification or data payload of a watermark to be embedded in media. The example watermark encoder 310 of FIG. 4 includes an example timestamp generator 410 to generate or otherwise obtain (e.g., from a clock, counter or other timing source) the timestamp symbols for the timestamp payload 210 of the watermark 200 described above. As such, the timestamp generator 410 is an example of means for generating the timestamp payload of a watermark to be embedded in media.

In the illustrated example, the watermark encoder 310 includes an example timestamp cycle evaluator 415 and an example encoded symbol swapper 420 to extend a range of the watermark timestamp 210. The timestamp cycle evaluator 415 of the illustrated example determines which one of a group of timestamp cycles is to be represented by the timestamp 210 generated by the timestamp generator 410. In the illustrated example, beginning with a starting reference time, a group of two or more timestamp cycles may be defined to correspond to a respective two or more successive periods of the timestamp 210, which repeat after a number of timestamp periods corresponding to the number of timestamp cycles included in the group. For example, for a group of timestamp cycles including two timestamp cycles, the two timestamp cycles correspond to alternating periods of the timestamp 210. In the illustrated example, the timestamp cycle evaluator 415 compares a time to be represented by the timestamp 210 (e.g., such as a current time) with the starting reference time to determine in which one of the group of timestamp cycles the time to be represented by the timestamp falls. The identified timestamp cycle is then determined by the timestamp cycle evaluator 415 to be represented by the timestamp 210 and, thus, associated with the watermark 200. As such, the timestamp cycle evaluator 415 is an example of means for determining which one of a plurality of timestamp cycles is to be represented by a timestamp of a watermark.

By associating the timestamp 210 with a particular one of the group of timestamp cycles, the time value represented by the timestamp 210 becomes the value of the timestamp 210 offset by a number of timestamp periods represented by the particular timestamp cycle associated with the timestamp 210. For example, for a group of timestamp cycles including two timestamp cycles, the time represented by the timestamp 210 may be the value of the timestamp 210 when the timestamp 210 represents (is associated with) the first timestamp cycle of the group, and may be the value of the timestamp 210 offset by one timestamp period when the timestamp 210 represents (is associated with) the second timestamp cycle of the group. In this manner, the range of time represented by the watermark (e.g., the timestamp range of the watermark) is extended from the timestamp's range of one timestamp period covering one timestamp cycle to a range corresponding to a number of timestamp periods covered by the group of timestamp cycles. For example, for a group of timestamp cycles including two timestamp cycles, the timestamp range of the watermark is extended from one timestamp period to two timestamp periods.

The encoded symbol swapper 420 of the illustrated example is included in the watermark encoder 310 to encode the timestamp cycle that is to be represented by the timestamp 210 into the watermark 200 to be encoded in the media. To do this, the encoded symbol swapper 420 uses different swapping configurations for swapping the symbols of the media identification payload 205 or data payload 205 of the watermark 200 to encode different ones of the group of timestamp cycles that can be represented by the timestamp 200 generated by the timestamp generator 410. In some examples, the encoded symbol swapper 420 uses a first swapping configuration corresponding to no swapping of symbols of the data payload 205 to encode a first one of the possible timestamp cycles in the watermark 200, a second swapping configuration corresponding to swapping a first pair of the symbols of the data payload 205 to encode a second one of the possible timestamp cycles in the watermark 200, a third swapping configuration corresponding to swapping a second pair of the symbols of the data payload 205 different than the first pair of symbols to encode a third one of the possible timestamp cycles in the watermark 200, etc. In some examples, a swapping configuration may specify more than two symbols to be swapped (re-ordered) to represent a particular one of the possible timestamp cycles. As such, the encoded symbol swapper 420 is an example of means for swapping at least two symbols of the watermark when the timestamp 210 is to represent a second one of the timestamp cycles in the group but not when the timestamp 210 is to represent a first one of the timestamp cycles in the group.

For example, for a group of timestamp cycles including two timestamp cycles, the first one of the timestamp cycles may be represented by no swapping of the symbols of the data payload 205 of the watermark 200, whereas the second one of the timestamp cycles may be represented by swapping symbol 220A (S1) and symbol 220B (S2) of the data payload 205 of the watermark 200. As another example, for a group of timestamp cycles including two timestamp cycles, the first one of the timestamp cycles may be represented by no swapping of the symbols of the data payload 205 of the watermark 200, whereas the second one of the timestamp cycles may be represented by swapping symbol 220A (S1) and symbol 220C (S3) of the data payload 205 of the watermark 200. As a further example, for a group of timestamp cycles including two timestamp cycles, the first one of the timestamp cycles may be represented by no swapping of the symbols of the data payload 205 of the watermark 200, whereas the second one of the timestamp cycles may be represented by swapping symbol 220B (S2) and symbol 220C (S3) of the data payload 205 of the watermark 200. As yet another example, for a group of timestamp cycles including two timestamp cycles, the first one of the timestamp cycles may be represented by swapping symbol 220A (S1) and symbol 220B (S2) of the data payload 205 of the watermark 200, whereas the second one of the timestamp cycles may be represented by swapping symbol 220B (S2) and symbol 220C (S3) of the data payload 205 of the watermark 200. As yet a further example, for a group of timestamp cycles including three timestamp cycles, the first one of the timestamp cycles may be represented by no swapping of the symbols of the data payload 205 of the watermark 200, the second one of the timestamp cycles may be represented by swapping symbol 220A (S1) and symbol 220B (S2) of the data payload 205 of the watermark 200, and the third one of the timestamp cycles may be represented by swapping symbol 220B (S2) and symbol 220C (S3) of the data payload 205 of the watermark 200. Other combinations of swapping configurations can be used to represent the different possible timestamp cycles in a given group of timestamp cycles. In some examples, the encoded symbol swapper 420 is structured to perform swapping of symbols in the first subset of symbols [S1 S2 S3] of the data payload 205, or of symbols in the second subset of symbols [S4 S5 S6], but is not permitted to swap symbols across those first and second symbol subsets of the data payload 205 of the watermark 200. For example, the encoded symbol swapper 420 may not be permitted to swap symbols S1 and S4, or symbols S2 and S5, etc.

In some examples, the permitted combinations of the symbols included in the media identification payload 205 or data payload 205 of the watermark 200 are pruned (e.g., disallowed) to ensure that the resulting payload after swapping by the encoded symbol swapper 420 satisfies one or more criteria. For example, analysis of the possible resulting payloads after swapping may reveal that one or more resulting combinations of swapped symbols do not satisfy a Hamming distance requirement and, thus, such symbol combinations may be removed as possible media identifiers, information values, etc. In some such examples, the data generator 405 is configured to block the generation of combination of symbols that have been pruned.

The example watermark encoder 310 of FIG. 4 further includes an example watermark embedder 425 to embed the watermark 200 (e.g., after any symbol swapping performed by the encoded symbol swapper 420) in media (e.g., obtained from the media database 305). For example, the watermark embedder 425 may use any appropriate watermark embedding technique to embed the watermark 200 in an audio portion/signal and/or video portion/signal of the media. As such, the watermark embedder 425 is an example of means for embedding a watermark (e.g., after any symbol swapping) in a first piece of media.

An example watermark decoder 500 that may be included in the example meter 114 of FIG. 1 to decode watermarks embedded in media is illustrated in FIG. 5. The watermark decoder 500 of the illustrated example is structured to extend a range of a watermark timestamp, such as the timestamp 210, included in a watermark, such as the watermark 200, embedded in monitored media. The example watermark decoder 500 includes an example symbol decoder 505 to decode symbols of a watermark detected in monitored media. For example, the symbol decoder 505 may use any appropriate watermarking detection technique to decode symbols of the watermark 200 detected as embedded in an audio portion/signal and/or video portion/signal of the media. The symbols detected by the symbol decoder 500 of the illustrated example include the detected symbols [A1 A2 A3 A4 A5 A6] of the watermark payload 205 described above, as well as detected versions of the symbols [T1 T2 T3 T4] of the timestamp payload 210 of the watermark 200. As such, the watermark decoder 500 is an example of means for decoding symbols of a watermark embedded in monitored media.

The watermark decoder 500 also includes an example watermark validator 510 to validate a decoded sequence watermark symbols obtained by the symbol decoder 505. In some examples, the watermark validator 510 is structured to validate the sequence of decoded symbols corresponding to the data payload 205 of the watermark 200. In some such examples, to validate the sequence of decoded symbols corresponding to the data payload 205, the watermark validator 510 attempts to find a single offset value that relates [A1 A2 A3] to [A4 A5 A6] by modulo addition according to the first system of relationships describes above. As described above, this single offset value corresponds to another symbol, S0. As described above, to perform such a validation, the watermark validator 510 assumes the values of the decoded watermark symbols [A1 A2 A3] obtained by the symbol decoder 505 are correct and correspond to the original watermark symbols [S1 S2 S3]. The watermark validator 510 then evaluates the first system of relationships described above using different possible offset values to attempt to find one offset value that when added to each of [A1 A2 A3] by modulo addition results in [A4 A5 A6]. If the watermark validator 510 is able to find one such offset value, that offset value is set to be the decoded value of S0, and the resulting sequence of decoded watermark data symbols [S0 S1 S2 S3] are considered valid. Otherwise, the watermark validator 510 determines the sequence of decoded watermark symbols obtained by the symbol decoder 505 is not valid. As such, the watermark validator 510 is an example of means for determining whether given sequences of symbols of a watermark decoded from a piece of media is valid.

In the illustrated example, the watermark decoder 500 includes an example decoded symbol swapper 515, an example timestamp cycle decoder 520 and an example watermark reported 525 to extend a range of the watermark timestamp 210. As described above, symbols of the watermark 200 may have been swapped by the watermark encoder 310 to encode a particular timestamp cycle to be represented by the timestamp 210 of the watermark 200. The example decoded symbol swapper 515 is to swap symbols of the decoded watermark according to the different possible symbol swapping configurations that can be employed by the watermark encoder 310 in the event the watermark validator 510 determines a given sequence of decoded watermark symbols is not valid. For example, if the watermark validator 510 determines the sequence of decoded symbols corresponding to the data payload 205 without any swapping (e.g., corresponding to a first swapping configuration) is valid, the decoded symbol swapper 515 does not perform any swapping of the decoded symbols and the decoded timestamp 210 is determined to represent the timestamp cycle corresponding to the first swapping configuration (e.g., no swapping). However, if the watermark validator 510 determines the sequence of decoded symbols corresponding to the data payload 205 without any swapping (e.g., corresponding to a first swapping configuration) is not valid, the decoded symbol swapper 515 swaps two or more decoded symbols of the data payload 205 in accordance with a second swapping configuration that could be employed by the watermark encoder 310. The watermark validator 510 then attempts to validate the resulting swapped sequence of decoded watermark data symbols. If the resulting swapped sequence of decoded watermark data symbols is valid, the decoded timestamp 210 is determined to represent the particular timestamp cycle corresponding to the second swapping configuration. However, if the resulting swapped sequence of decoded watermark data symbols is not valid, the decoded symbol swapper 515 can continue to swap decoded symbols of the data payload 205 in accordance with other swapping configurations that could be employed by the watermark encoder 310 to determine if any of those swapping configurations result in a valid sequence of decoded symbols for the data payload 210 of the watermark 200. As such, the decoded symbol swapper 515 is an example of means for swapping at least two symbols of a watermark to determine a second sequence of symbols when a first sequence of symbols is not valid. In some examples, if none of the possible swapping configurations result in a valid sequence of decoded symbols for the data payload 210, the watermark validator 510 determines the decoded watermark symbols should be discarded as invalid.

The timestamp cycle decoder 520 of the illustrated example is included in the watermark decoder 500 to decode the particular timestamp cycle to be represented by the timestamp 210 decoded by the symbol decoder 505 for a detected watermark 200. In the illustrated example, the timestamp cycle decoder 520 determines that the detected watermark 200 is associated with the particular one of the group of possible timestamp cycles corresponding to the particular symbol swapping configuration that yielded a valid sequence of decoded symbols for the data payload 210 of the watermark 200. For example, if the sequence of decoded symbols obtained for the data payload 210 is determined to be valid without any swapping, the timestamp cycle decoder 520 determines the detected watermark 200 is associated with a first timestamp cycle corresponding to a first swapping configuration specifying no symbol swapping. However, if the sequence of decoded symbols obtained for the data payload 210 is determined to be valid when the symbols are swapped by the decoded symbol swapper 515 according to a second swapping configuration of the possible swapping configurations that can be used by the watermark encoder 310, the timestamp cycle decoder 520 determines the detected watermark 200 is associated with a second timestamp cycle corresponding to that second swapping configuration. Likewise, if the sequence of decoded symbols obtained for the data payload 210 is determined to be valid when the symbols are swapped by the decoded symbol swapper 515 according to a third swapping configuration of the possible swapping configurations that can be used by the watermark encoder 310, the timestamp cycle decoder 520 determines the detected watermark 200 is associated with a third timestamp cycle corresponding to that second swapping configuration, and so on. As such, the timestamp cycle decoder 520 is an example of means for associating a watermark with a first one of a plurality of timestamp cycles when a first sequence of decoded watermark symbols is valid, and when the first sequence of symbols is not valid, associating the watermark with a second one of a plurality of timestamp cycles when a second sequence of watermark symbols (which includes swapped symbols relative to the first sequence) is determined to be valid.

The watermark reporter 525 of the illustrated example is included in the watermark decoder 500 to report the final version of the watermark 200 decoded from the monitored media. For example, the watermark reporter 525 reports the data payload 205 of the decoded watermark 200 to be the sequence of decoded symbols with any swapping that was performed to yield a valid sequence as determined by the watermark validator 510. The watermark reporter 525 of the illustrated example reports the timestamp payload 210 of the watermark 200 as the time value represented by the decoded symbols of the timestamp 210 adjusted, if appropriate, by a number of timestamp periods corresponding to the timestamp cycle encoded in the watermark 200, as described above. For example, watermark reporter 525 may report the time represented by the decoded timestamp 210 to be the value of the timestamp 210 when the timestamp cycle decoder 520 determines the timestamp 210 represents (is associated with) the first timestamp cycle of the group of possible timestamp cycles, and may report the time represented by the decoded timestamp 210 to be the value of the timestamp 210 offset by one timestamp period when the timestamp cycle decoder 520 determines the timestamp 210 represents (is associated with) the second timestamp cycle of the group, etc. As such, watermark reporter 525 is an example of means for constructing final watermark data from watermark symbols decoded from a detected watermark and swapped according to a particular swapping configuration corresponding to particular timestamp cycle represented by the timestamp of the watermark. The watermark reporter 525 then reports the decoded watermark 200 to the central facility 190, as described above.

While example manners of implementing the watermark encoder 310 and the watermark decoder 500 are illustrated in FIGS. 3-5, one or more of the elements, processes and/or devices illustrated in FIGS. 3-5 may be combined, divided, re-arranged, omitted, eliminated and/or implemented in any other way. Further, the example data generator 405, the example timestamp generator 410, the example timestamp cycle evaluator 415, the example encoded symbol swapper 420, the example watermark embedder 425, the example symbol decoder 505, the example watermark validator 510, the example decoded symbol swapper 515, the example timestamp cycle decoder 520, the example watermark reported 525 and/or, more generally, the example watermark encoder 310 and the example watermark decoder 500 of FIGS. 3-5 may be implemented by hardware, software, firmware and/or any combination of hardware, software and/or firmware. Thus, for example, any of the example data generator 405, the example timestamp generator 410, the example timestamp cycle evaluator 415, the example encoded symbol swapper 420, the example watermark embedder 425, the example symbol decoder 505, the example watermark validator 510, the example decoded symbol swapper 515, the example timestamp cycle decoder 520, the example watermark reported 525 and/or, more generally, the example watermark encoder 310 and the example watermark decoder 500 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example watermark encoder 310, the example watermark decoder 500, the example data generator 405, the example timestamp generator 410, the example timestamp cycle evaluator 415, the example encoded symbol swapper 420, the example watermark embedder 425, the example symbol decoder 505, the example watermark validator 510, the example decoded symbol swapper 515, the example timestamp cycle decoder 520 and/or the example watermark reported 525 is/are hereby expressly defined to include a non-transitory computer readable storage device or storage disk such as a memory, a digital versatile disk (DVD), a compact disk (CD), a Blu-ray disk, etc. including the software and/or firmware. Further still, the example watermark encoder 310 and/or the example watermark decoder 500 may include one or more elements, processes and/or devices in addition to, or instead of, those illustrated in FIGS. 3-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
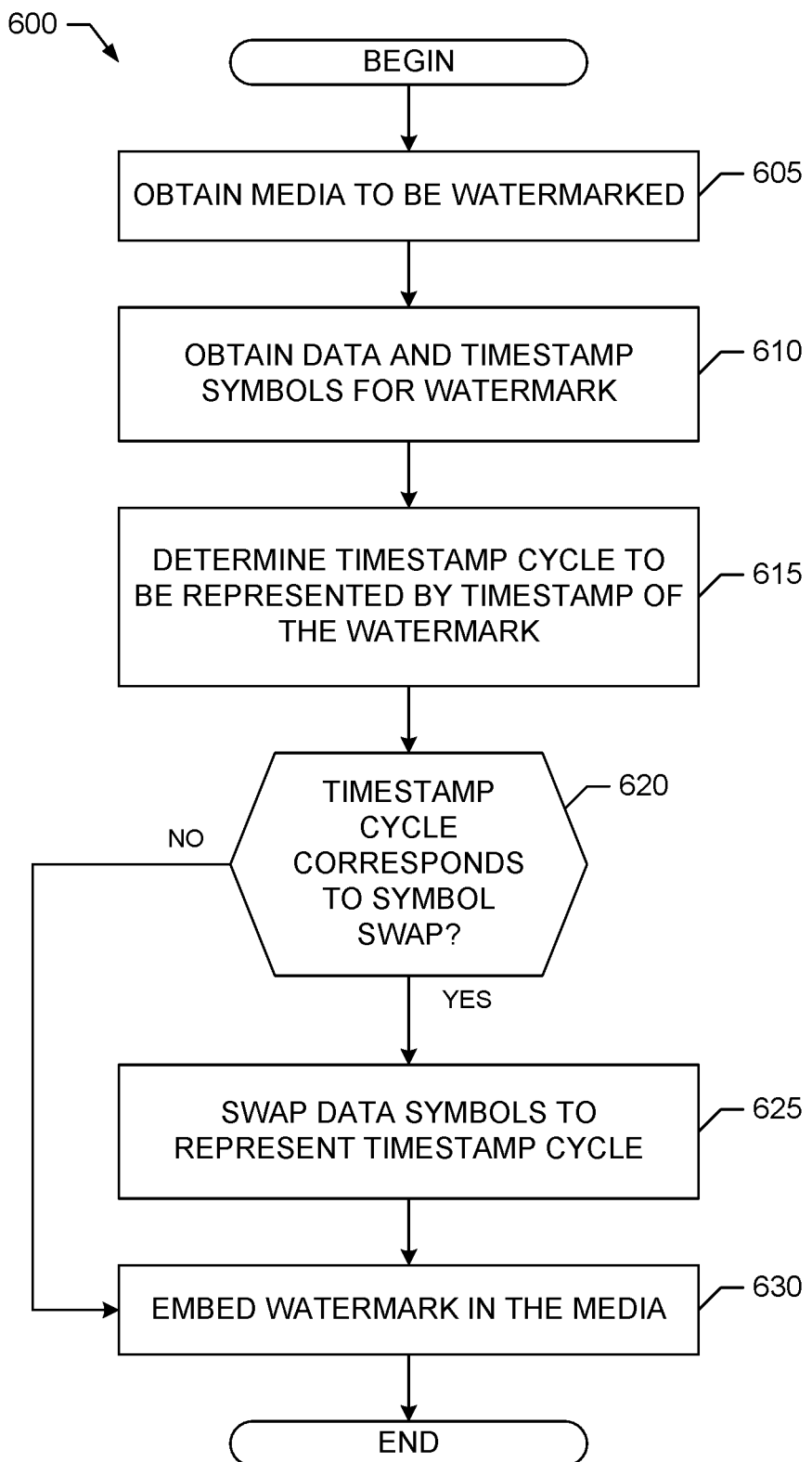
FIG. 6 is a flowchart representative of example computer readable instructions that may be executed to implement the example watermark encoder of FIGS. 3 and/or 4.
Figure 7:
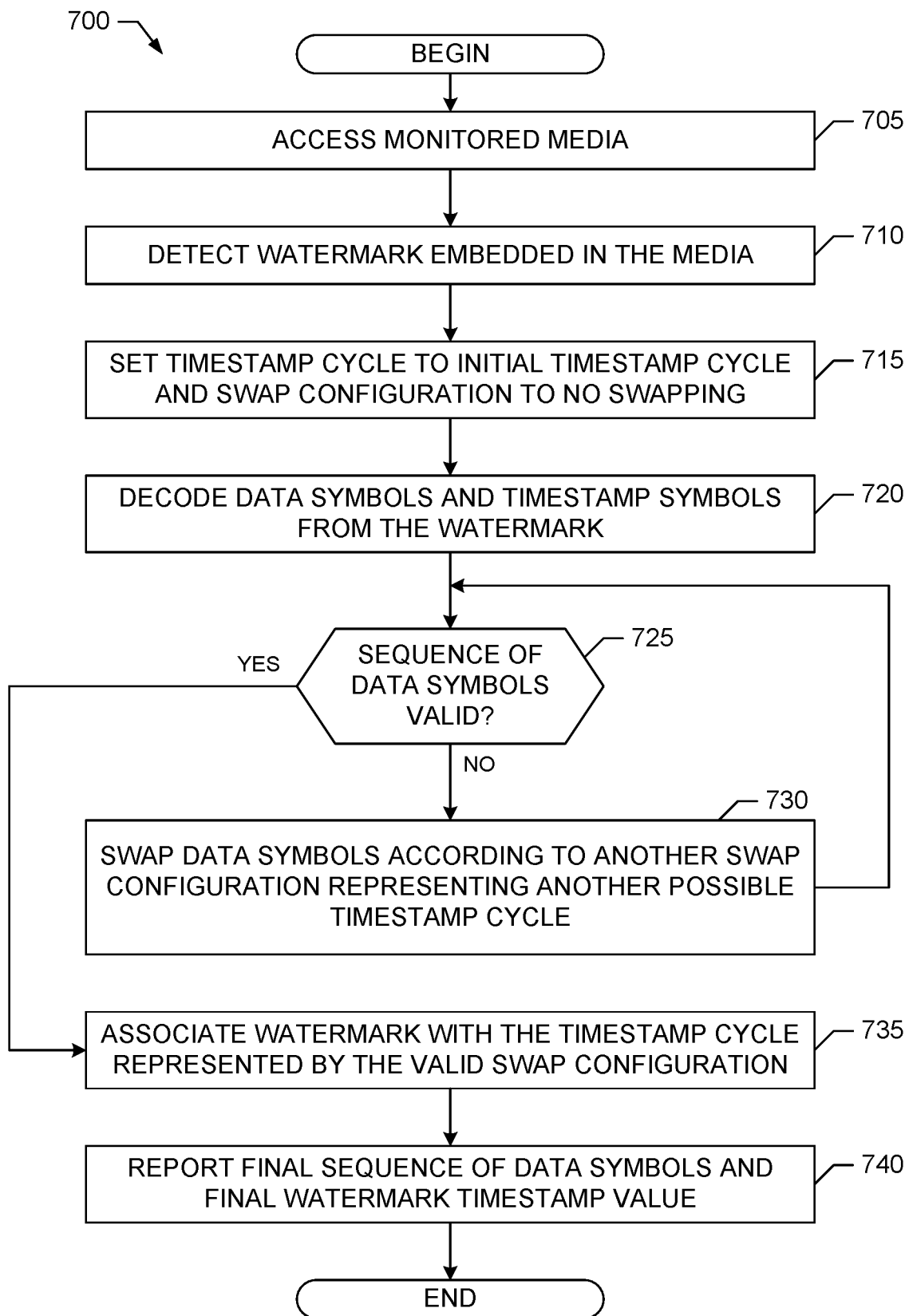
FIG. 7 is a flowchart representative of example computer readable instructions that may be executed to implement the example watermark decoder of FIG. 5.

Flowcharts representative of example hardware logic, machine readable instructions, hardware implemented state machines, and/or any combination thereof for implementing the example watermark encoder 310 and the example watermark decoder 500 are shown in FIGS. 6-7. In these examples, the machine readable instructions may be one or more executable programs or portion(s) thereof for execution by a computer processor, such as the processor 812 and/or the processor 912 shown in the example processor platform 800 and/or the example processor platform 900 discussed below in connection with FIGS. 8-9. The one or more programs, or portion(s) thereof, may be embodied in software stored on a non-transitory computer readable storage medium such as a CD-ROM, a floppy disk, a hard drive, a DVD, a Blu-Ray Disk™, or a memory associated with the processor 812 and/or the processor 912, but the entire program or programs and/or parts thereof could alternatively be executed by a device other than the processor 812 and/or the processor 912 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 6-7, many other methods of implementing the example watermark encoder 310 and the example watermark decoder 500 may alternatively be used. For example, with reference to the flowcharts illustrated in FIGS. 6-7, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an ASIC, a comparator, an operational-amplifier (op-amp), a logic circuit, etc.) structured to perform the corresponding operation without executing software or firmware.

As mentioned above, the example processes of FIGS. 6-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

An example program 600 that may be executed to implement the example watermark encoder 310 of FIGS. 3 and/or 4 is illustrated in FIG. 6. With reference to the preceding figures and associated written descriptions, the example program 600 of FIG. 6 begins execution at block 605 at which the example watermark embedder 425 of the watermark encoder 310 obtains a piece of media be watermarked, such as from the example media database 305, as described above. At block 610, the example data generator 405 of the watermark encoder 310 obtains, as described above, the data symbols of the data payload 205 of the watermark 200 to be embedded in the media. Also at block 610, the example timestamp generator 410 of the watermark encoder 310 obtains, as described above, the timestamp symbols of the timestamp payload 210 of the watermark 200 to be embedded in the media. At block 615, the example timestamp cycle evaluator 415 of the watermark encoder 310 determines, as described above, which one of a group of timestamp cycles is to be represented by the timestamp 210 obtained at block 610.

At block 620, the example encoded symbol swapper 420 of the watermark encoder 310 determines whether the particular timestamp cycle to be represented by the timestamp 210 is to be encoded in the watermark 200 in accordance with a symbol swapping configuration that involves swapping at least two of the symbols of the watermark 200, as described above. If the particular timestamp cycle corresponds to a symbol swapping configuration involving a symbol swap (at block 620), the encoded symbol swapper 420 swaps symbols of the watermark in accordance with that swapping configuration, as described above. At block 630, the watermark embedder 425 embeds the watermark 200 in the media, as described above.

An example program 700 that may be executed to implement the example watermark decoder 500 of FIG. 5 is illustrated in FIG. 7. With reference to the preceding figures and associated written descriptions, the example program 700 of FIG. 7 begins execution at block 705 at which the example symbol decoder 505 of the watermark decoder 500 accesses monitored media. At block 710, the symbol decoder 505 detects a watermark 200 embedded in the monitored media. At block 715, the example decoded symbol swapper 515 of the watermark decoder 500 initializes the swapping configuration to be applied to the decoded symbols of the detected watermark 200 to be a first swapping configuration corresponding to no symbol swapping. At block 715, the example timestamp cycle decoder 520 of the watermark decoder 500 initializes the timestamp cycle to be associated with a timestamp of the watermark 200 to be an initial timestamp cycle corresponding to the first swapping configuration (e.g., no swapping). In some examples, at block 715, timestamp cycle decoder 520 sets the initial timestamp cycle to be the one of the group of possible timestamp cycles corresponding to a current time, and the decoded symbol swapper 515 sets the initial swapping configuration to be performed on the decoded watermark symbols to be the particular swapping configuration used to represent the initialized timestamp cycle.

At block 720, the symbol decoder 505 decodes the symbols of the detected watermark 200, including the decoded data symbols for the data payload 205 of the watermark 200 and the decoded timestamp symbols for the timestamp payload of the watermark 200. At block 725, the example watermark validator 510 determines, as described above, whether the sequence of decoded data symbols for the data payload 205 is valid. If the sequence of decoded data symbols is not valid (block 725), at block 730 the decoded symbol swapper 515 swaps, as described above, at least two symbols of the decoded data payload 205 in accordance with another swapping configuration corresponding to another possible timestamp cycle that can be represented by the decoded timestamp 210. Blocks 725 and 730 are repeated until the watermark validator 510 determines a particular swapping configuration yields a valid sequence of decoded data symbols for the data payload 205, as described above. At block 735, the timestamp cycle decoder 520 associates the detected watermark 200 with the particular timestamp cycle corresponding to the particular swapping configuration that yielded a valid sequence of decoded data symbols for the data payload 205, as described above. At block 740, the example watermark reported 525 of the watermark decoder 500 reports, as described above, the final version of the detected watermark 200, which includes the final sequence of decoded data symbols for the data payload 205 (e.g., with symbols swapped according to the swapping configuration determined to be valid) and the timestamp payload 210 adjusted based on the particular timestamp cycle determined to be associated with the detected watermark 200.

Figure 8:
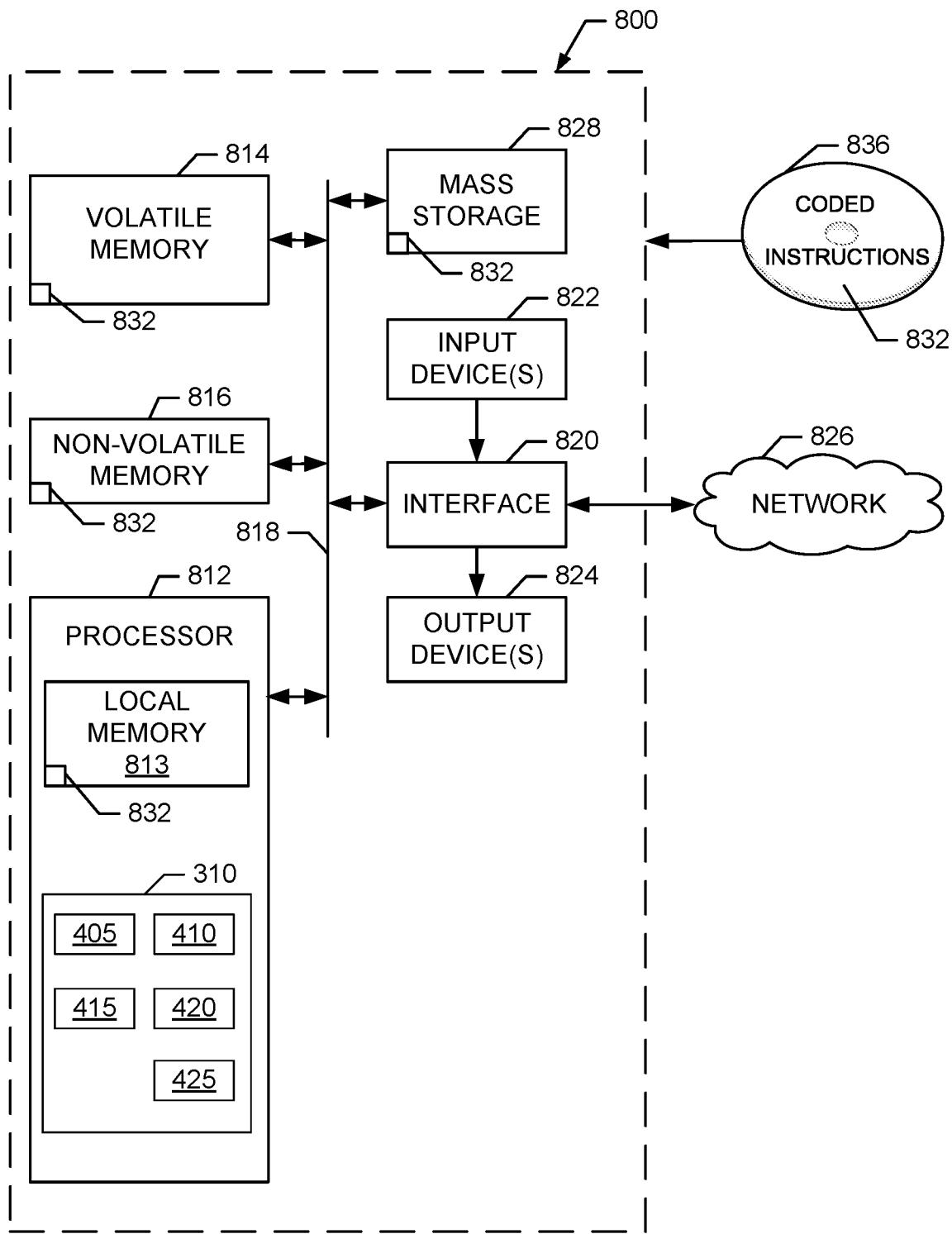
FIG. 8 is a block diagram of an example processor platform structured to execute the example computer readable instructions of FIG. 5 to implement the example watermark encoder of FIGS. 3 and/or 4.

FIG. 8 is a block diagram of an example processor platform 800 structured to execute the instructions of FIG. 6 to implement the example watermark encoder 310 of FIGS. 3 and/or 4. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a digital camera, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor 812 may be a semiconductor based (e.g., silicon based) device. In this example, the processor 812 implements the example data generator 405, the example timestamp generator 410, the example timestamp cycle evaluator 415, the example encoded symbol swapper 420 and/or the example watermark embedder 425.

The processor 812 of the illustrated example includes a local memory 813 (e.g., a cache). The processor 812 of the illustrated example is in communication with a main memory including a volatile memory 814 and a non-volatile memory 816 via a link 818. The link 818 may be implemented by a bus, one or more point-to-point connections, etc., or a combination thereof. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 800, can allow the user to control the computer system and provide data to the computer using physical gestures, such as, but not limited to, hand or body movements, facial expressions, and face recognition.

One or more output devices 824 are also connected to the interface circuit 820 of the illustrated example. The output devices 824 can be implemented, for example, by display devices (e.g., a light emitting diode (LED) display, an organic light emitting diode (OLED) display, a liquid crystal display (LCD), a cathode ray tube (CRT) display, an in-place switching (IPS) display, a touchscreen, etc.), a tactile output device, a printer and/or speakers(s). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL), connection, a telephone line connection, coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 corresponding to the instructions of FIG. 6 may be stored in the mass storage device 828, in the volatile memory 814, in the non-volatile memory 816, in the local memory 813 and/or on a removable non-transitory computer readable storage medium, such as a CD or DVD 836.

Figure 9:
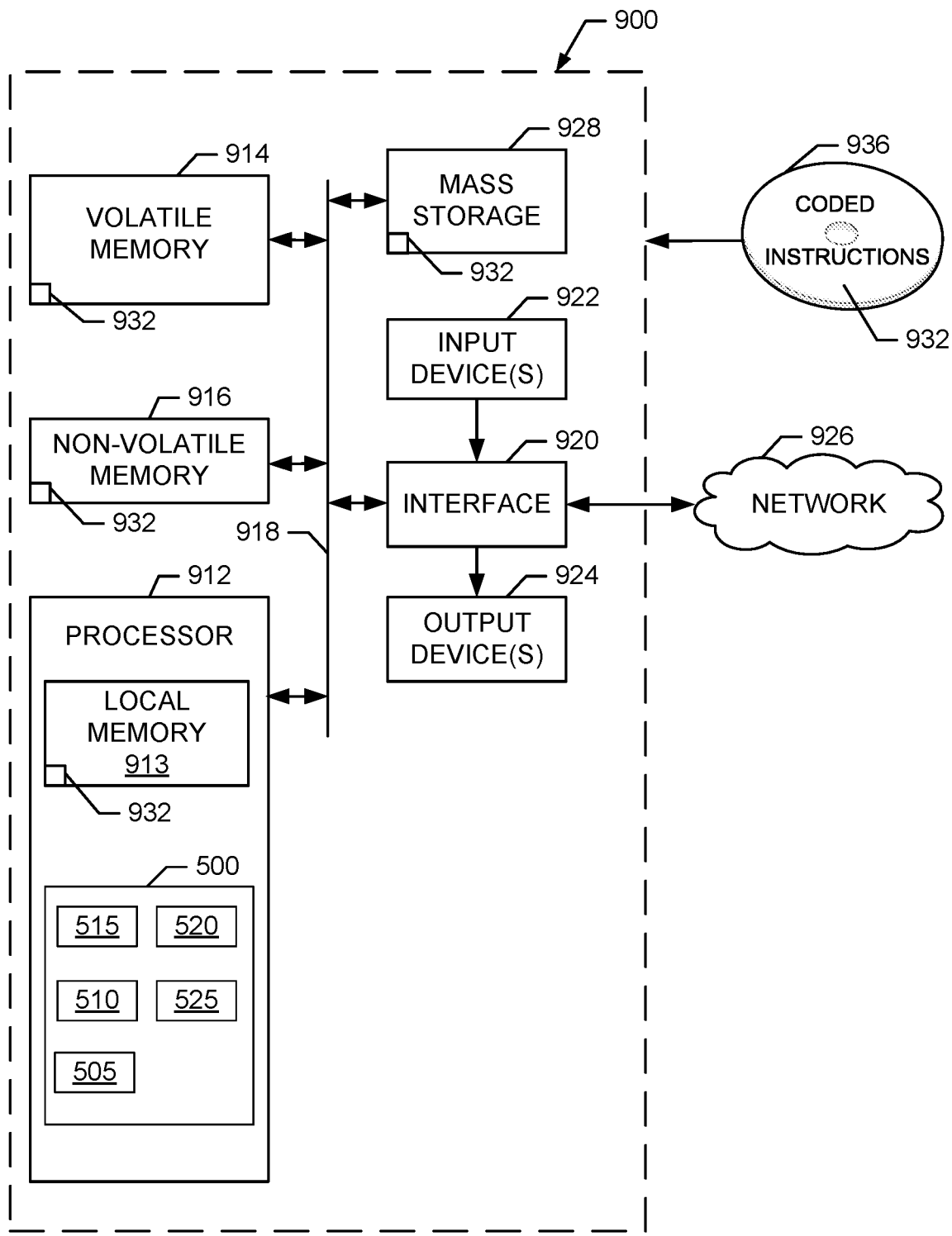
FIG. 9 is a block diagram of an example processor platform structured to execute the example computer readable instructions of FIG. 7 to implement the example watermark decoder of FIG. 5.

FIG. 9 is a block diagram of an example processor platform 900 structured to execute the instructions of FIG. 7 to implement the example watermark decoder 500 of FIG. 5. The processor platform 900 can be, for example, a server, a personal computer, a workstation, a self-learning machine (e.g., a neural network), a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box, a digital camera, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor 912 may be a semiconductor based (e.g., silicon based) device. In this example, the processor 912 implements the example symbol decoder 505, the example watermark validator 510, the example decoded symbol swapper 515, the example timestamp cycle decoder 520 and/or the example watermark reported 525.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by SDRAM, DRAM, RDRAM® and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a USB interface, a Bluetooth® interface, an NFC interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuit 820 of the illustrated example. The output devices 924 can be implemented, for example, by display devices (e.g., an LED display, an OLED display, an LCD display, a CRT display, an IPS display, a touchscreen, etc.), a tactile output device, a printer and/or speakers(s). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a DSL, connection, a telephone line connection, coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and DVD drives.

The machine executable instructions 932 corresponding to the instructions of FIG. 7 may be stored in the mass storage device 928, in the volatile memory 914, in the non-volatile memory 916, in the local memory 913 and/or on a removable non-transitory computer readable storage medium, such as a CD or DVD 936.

From the foregoing, it will be appreciated that example methods, apparatus and articles of manufacture have been disclosed that extend a time range supported by a media watermark. Example watermarking techniques disclosed herein provide technical solutions to the problem of extending a timestamp range supported by a watermark, but without the need to change the number of timestamp symbols or restructure the watermark. Disclosed example watermarking techniques achieve this technical solution by swapping data symbols of the watermark according to different symbol swapping configurations to encode different possible timestamp cycles to be represented by the watermark timestamp.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A watermark encoding apparatus comprising:
at least one processor;
computer readable instructions; and
at least one processor to execute the instructions to:
determine which one of a plurality of timestamp cycles is to be represented by a timestamp of a watermark;
swap at least two symbols of the watermark when the timestamp is to represent a second one of the timestamp cycles, but not swap the at least two symbols of the watermark when the timestamp is to represent a first one of the timestamp cycles, the watermark including a first set of symbols representing data and a second set of symbols representing the timestamp, the first set of symbols including a first subset of symbols and a second subset of symbols, respective ones of the second subset of symbols to be determined from corresponding ones of the first subset of symbols based on another symbol not included in the first and second subsets of symbols, and the at least two symbols to be swapped are included in one of the first subset of symbols or the second subset of symbols, but not both of the first and second subsets of symbols; and
embed the watermark in a first piece of media.

2. The apparatus of claim 1, wherein the timestamp has a timestamp range covering one timestamp cycle, and the watermark has a timestamp range covering the plurality of timestamp cycles.

3. The apparatus of claim 2, wherein one timestamp cycle corresponds to a time period of substantially 28 days.

4. The apparatus of claim 1, wherein the data corresponds to an identifier of the piece of media.

5. The apparatus of claim 1, wherein a number of timestamp cycles in the plurality of timestamp cycles is two.

6. A watermark encoding apparatus comprising:
means for determining which one of a plurality of timestamp cycles is to be represented by a timestamp of a watermark;
means for swapping at least two symbols of the watermark when the timestamp is to represent a second one of the timestamp cycles, the means for swapping not to swap the at least two symbols of the watermark when the timestamp is to represent a first one of the timestamp cycles, the watermark including a first set of symbols representing data and a second set of symbols representing the timestamp, the first set of symbols including a first subset of symbols and a second subset of symbols, respective ones of the second subset of symbols to be determined from corresponding ones of the first subset of symbols based on another symbol not included in the first and second subsets of symbols, and the at least two symbols to be swapped are included in one of the first subset of symbols or the second subset of symbols, but not both of the first and second subsets of symbols; and
means for embedding the watermark in a first piece of media.

7. The apparatus of claim 6, wherein the timestamp has a timestamp range covering one timestamp cycle, and the watermark has a timestamp range covering the plurality of timestamp cycles.

8. The apparatus of claim 7, wherein one timestamp cycle corresponds to a time period of substantially 28 days.

9. The apparatus of claim 6, wherein the data corresponds to an identifier of the piece of media.

10. The apparatus of claim 6, wherein a number of timestamp cycles in the plurality of timestamp cycles is two.

11. A watermark decoding apparatus:
at least one processor;
computer readable instructions; and
at least one processor to execute the instructions to:
determine whether a first sequence of symbols of a decoded watermark obtained from a first piece of media is valid;
swap at least two symbols of the decoded watermark to determine a second sequence of symbols when the first sequence of symbols is not valid;
when the first sequence of symbols is valid, associate the decoded watermark with a first one of a plurality of timestamp cycles; and
when the first sequence of symbols is not valid, associate the decoded watermark with a second one of the plurality of timestamp cycles when the second sequence of symbols is determined to be valid.

12. The apparatus of claim 11, wherein the first sequence of symbols includes a first set of symbols representing data and a second set of symbols representing a timestamp.

13. The apparatus of claim 12, wherein the at least two symbols to be swapped to determine the second sequence of symbols are included in the first set of symbols representing the data.

14. The apparatus of claim 13, wherein the first set of symbols includes a first subset of symbols and a second subset of symbols, and the at least one processor is to:
   determine the first sequence of symbols is valid when respective ones of the second subset of symbols are related to corresponding ones of the first subset of symbols based on another symbol not included in the first and second subsets of symbols; and
   determine the first sequence of symbols is not valid when respective ones of the second subset of symbols are not related to corresponding ones of the first subset of symbols based on the another symbol not included in the first and second subsets of symbols.

15. The apparatus of claim 12, wherein the timestamp has a timestamp range covering a single timestamp cycle, and the decoded watermark has a timestamp range covering the plurality of timestamp cycles.

16. A watermark decoding apparatus comprising:
   means for determining whether a first sequence of symbols of a decoded watermark obtained from a first piece of media is valid;
   means for swapping at least two symbols of the decoded watermark to determine a second sequence of symbols when the first sequence of symbols is not valid; and
   means for associating the decoded watermark with one of a plurality of timestamp cycles, the means for associating to:
      associate the decoded watermark with a first one of the plurality of timestamp cycles when the first sequence of symbols is valid; and
      when the first sequence of symbols is not valid, associate the decoded watermark with a second one of the plurality of timestamp cycles when the second sequence of symbols is determined to be valid.

17. The apparatus of claim 16, wherein the first sequence of symbols includes a first set of symbols representing data and a second set of symbols representing a timestamp.

18. The apparatus of claim 17, wherein the at least two symbols to be swapped to determine the second sequence of symbols are included in the first set of symbols representing the data.

19. The apparatus of claim 18, wherein the first set of symbols includes a first subset of symbols and a second subset of symbols, and the means for determining is to:
   determine the first sequence of symbols is valid when respective ones of the second subset of symbols are related to corresponding ones of the first subset of symbols based on another symbol not included in the first and second subsets of symbols; and
   determine the first sequence of symbols is not valid when respective ones of the second subset of symbols are not related to corresponding ones of the first subset of symbols based on the another symbol not included in the first and second subsets of symbols.

20. The apparatus of claim 17, wherein the timestamp has a timestamp range covering a single timestamp cycle, and the decoded watermark has a timestamp range covering the plurality of timestamp cycles.

* * * * *